United States Patent [19]

Ulveling et al.

[11] 4,354,665
[45] Oct. 19, 1982

[54] VALVE FOR OPENING AND CLOSING A FLUID CONDUIT

[75] Inventors: Leon Ulveling; Pierre Mailliet, both of Howald, Luxembourg

[73] Assignee: Paul Wurth S.A., Luxembourg

[21] Appl. No.: 156,757

[22] Filed: Jun. 5, 1980

[30] Foreign Application Priority Data

Jun. 15, 1979 [LU] Luxembourg ............... 81386

[51] Int. Cl.³ ................................. F16K 1/18
[52] U.S. Cl. ............................ 251/298; 251/299; 251/315; 251/85
[58] Field of Search ............ 222/556; 251/298, 299, 251/85, 315

[56] References Cited

U.S. PATENT DOCUMENTS

| | | | |
|---|---|---|---|
| 2,029,864 | 2/1936 | Elgaard | 251/58 |
| 3,379,408 | 4/1968 | Lowrey | 251/298 |
| 3,799,188 | 3/1974 | Chronister | 251/301 |
| 3,995,827 | 12/1976 | Piguet | 251/58 |
| 4,071,221 | 1/1978 | Disciascio et al. | 251/85 |
| 4,130,268 | 12/1978 | Kojima et al. | 251/298 |
| 4,150,811 | 4/1979 | Condit | 251/315 |
| 4,253,485 | 3/1981 | Legille | 251/298 |

FOREIGN PATENT DOCUMENTS

| | | | |
|---|---|---|---|
| 128274 | 10/1927 | Switzerland | 251/315 |
| 782851 | 9/1957 | United Kingdom | 251/159 |

*Primary Examiner*—H. Jay Spiegel
*Attorney, Agent, or Firm*—David S. Fishman

[57] ABSTRACT

A valve for opening and closing a fluid conduit of the type having a generally wide cross-section, the conduit having a transverse slit therein to allow for movement of a shut-off member into and out of registration therewith. The shut-off member has a spherical shape and cooperates with an apertured member which defines a surface of the same sphere. Both the shut-off member and the apertured member may be arcuately displaced, about a common axis, to establish either a closed or opened conduit with leakage from the conduit in either the opened or closed position being prevented by peripheral portions of the shut-off member and apertured member.

5 Claims, 3 Drawing Figures

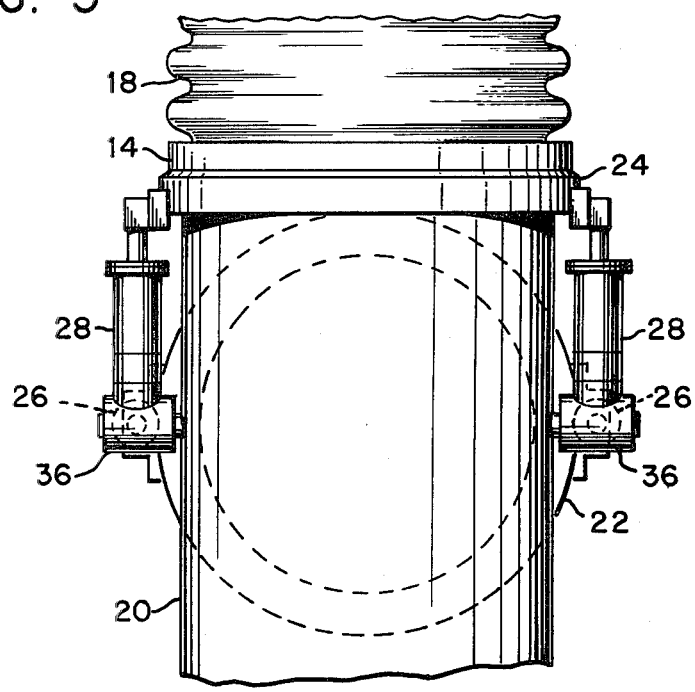

VALVE FOR OPENING AND CLOSING A FLUID CONDUIT

BACKGROUND OF THE INVENTION (1) Field of the Invention

The present invention relates to a valve for opening and closing a fluid conduit. More specifically, the present invention relates to apparatus for opening and closing a gas conduit having a generally wide cross sectional area. Although not limited thereto, the invention has utility in a conduit for conducting crude blast furnace gases from a blast furnace used in the manufacture of steel.

(2) Description of the Prior Art

U.S. patent application Ser. No. 909,934, now U.S. Pat. No. 4,253,485 discloses a valve for opening and closing a fluid conduit by means of a shut-off element or valve member having a spherical surface displaceable about its centre of curvature, across a transversal slit in the conduit, between an opening and a closing position.

The shut-off element of the U.S. Pat. No. 4,253,485 essentially consists of a valve member in the form of a spherical cap which, in the closed position, is wedged between a movable seat and a fixed seat of the conduit. In order to ensure adequate hermeticity, the presence of a fluid tight seal at each side of the valve member is indispensible. If one of these seals is incorporated in a peripheral tight joint of the valve member itself it is essential for the second seal to be provided on one of the seats, either the fixed or the movable seat of the conduit, in order to ensure tightness when the valve member is in the open position, i.e. disengaged from the conduit, and the two seats are applied against each other. The fact is that if the two fluid tight joints were mounted on the valve member there would be no seal between the two seats of the conduit.

Unfortunately the seal which has to be provided on one of the facing conduit valve seats, delimiting the slit for the insertion of the valve member, is not easily accessible for removal or replacement of the sealing rings or surfaces. On the other hand, if both joints could be provided on the valve member no problem of accessibility would arise, since in the open position there is no longer any contact between the valve member and the conduit. Unfortunately, however, a valve member such as proposed in the above-mentioned U.S. Pat. No. 4,253,485 does not allow of this possibility.

In a second constructional version, said patent U.S. Pat. No. 4,253,485 proposes a shut-off element of the "goggle valve" type, with a full section and an open section. In this second version it is not necessary to provide a seal on one of the seats which delimit the "flow slit" of the shut-off element.

Unfortunately, the said second constructional version comprising a shut-off element of the goggle valve type is not feasible with the telescopic nature of its supporting arm which enables the full section or the open section to be wedged between the two seatings of the conduit.

SUMMARY OF THE INVENTION

The purpose of the present invention is to overcome the above-discussed and other disadvantages and provide a new type of shut-off element which affords easy access to the sealing surfaces and which enables the moveable member to be wedged between the valve seats which extend around the conduit sections at the periphery of the slit in the conduit.

According to this invention, there is provided a valve for opening and closing a fluid conduit by means of a shut-off element having a spherical surface displaceable about its centre of curvature, across a transversal slit in the conduit, between an opening and a closing position. The valve of the present invention comprises a moveable first element or valve member with a full section and a moveable second element with an open section. These two elements are independent of each other but together forming a spherical surface. Each of these elements is borne by a pair of telescopic arms.

These arms are rendered telescopic by the incorporation, into their interior, of a stack of washers of the "Belleville" type.

BRIEF DESCRIPTION OF THE DRAWING

Further features and characteristics will be apparent from the following detailed description provided below, by way of illustration, of one specific embodiment of the invention, by reference to FIGS. 1 and 2, which are schematic side elevation views, partly in section, of a valve according to the present invention, in the open and in the closed position respectively. Understanding of the present invention will be further facilitated by reference to FIG. 3 which shows the disclosed embodiment of the invention rotated about the axis of the conduit in which it is installed by 90° relative to the FIG. 2 showing.

DESCRIPTION OF THE PREFERRED EMBODIMENT

Figure 1:
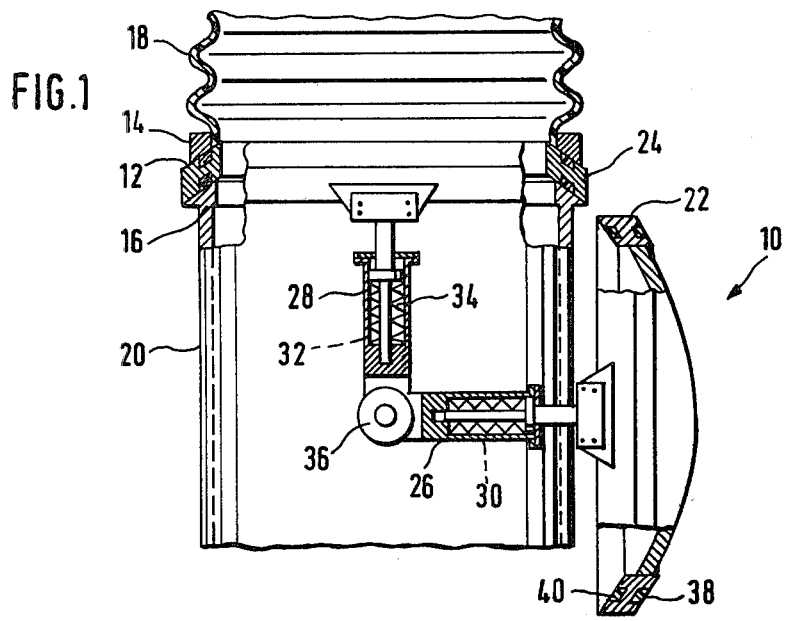

The figures show schematically a shut-off element indicated generally at 10, designed to slide in accordance with a spherical surface in a slit 12, delimited by a fixed seat 16 and an axially movable seat 14 of a conduit 20. Conduit 20 may, for example, as in referenced U.S. Pat. No. 4,253,485 consist of the collecting conduit situated immediately above a device for removal of the dust from the crude gas of a blast furnace. The seat 14 is movable in the axial direction by means of a compensator 18 and devices, not shown, which are explained in greater detail in the above referenced co-pending patent application.

Figure 2:
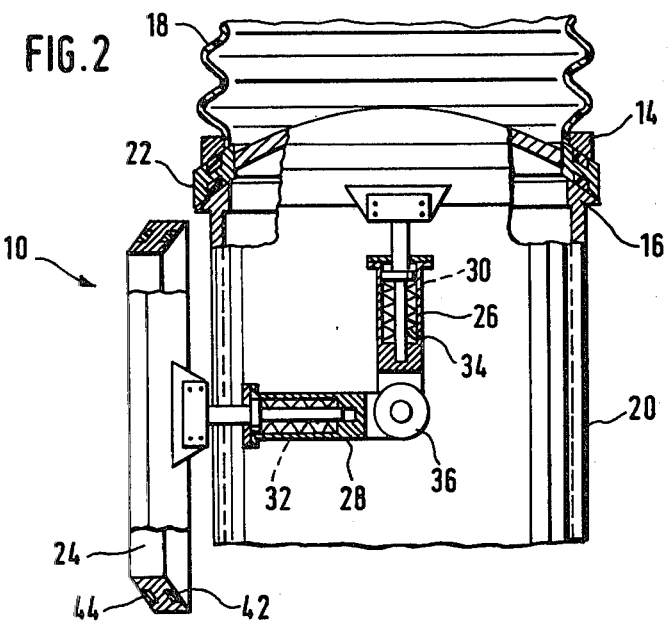

The shut-off element 10 according to the present invention consists of a first element having a full or continuous cross section 22. Accordingly, element or valve member 22 will block the passage in the conduit when in the position shown in FIG. 2. The shut-off element 10 also comprises a second element 24 which has an open cross section. Accordingly, with the device in the position shown in FIG. 1 fluid may flow through conduit 20 and element 24. The elements 22 and 24 are carried by pairs of arms 26, 30, and 28, 32, respectively, mounted on the exterior of the conduit 20. The pairs of arms are connected, at the ends displaced away from the elements 22 and 24, to a drive shaft 36, which is actuated as described in the above-referenced co-pending patent application. During the rotation of shaft 36, the movable seat 14 is slightly lifted in order to free the element 22 or the element 24.

As in the known valve, each of the arms 26, 28, 30 and 32 is telescopic, and for this purpose it comprises a stack of "Belleville" washers 34, which enable the element situated in the slit 12 to be slightly raised from the lower seat 16, for the sliding movement, or to be caused to come to rest against the said seat, in order to obtain the right closure. This axial movement, ensured by the telescopic nature of the supporting arms, is only possible thanks to the fact that the two elements 22 and 24 are independent of each other. If elements 22 and 24 were integral with each other, as in a conventional goggle valve, the axial movement of the element present in the slit 12 would be prevented by the method of mounting the other element, situated outside the conduit.

Elements 22 and 24 carry pairs of sealing rings 38, 40, and 42, 44, respectively, to ensure hermeticity when the element in question is in position in the slit 12. Accordingly, it is not necessary to provide a sealing surface on one of the two conduit seat portions 14, 16, since these latter are at all times separated, either by the element 22 or by the element 24. All four sealings rings or surfaces are thus fully accessible, this applying in particular of the seals 38 and 40 when the shut-off element is in the open position shown in FIG. 1, and to the joints 42 and 44 when it is in the closed position shown in FIG. 1.

We claim:

1. A valve for opening and closing a fluid conduit, the conduit having an axis and generally wide cross-section, the conduit further having a slit therein defined by facing ends of upstream and downstream conduit portions, at least one of said conduit portions being relatively movable with respect to the other, the valve comprising:

a moveable shut-off member, said shut-off member having a spherical shape and a pair of peripheral sealing surfaces, said sealing surfaces comprising sealing ring means carried by said member, said sealing ring means being in registration on oppositely disposed sides of the member;

means supporting said shut-off member for movement with respect to the conduit axis and through said slit, said supporting means comprising a first pair of oppositely situated telescopic arms, first ends of said arms of said first pair being coupled to said shut-off member;

a moveable apertured member spaced from said moveable shut-off member, said apertured member defining a spherical shape having the same radius as said shut-off member, said apertured member further having a pair of peripheral sealing surfaces with the same circumference as the sealing surfaces of said shut-off member, said sealing surfaces of said apertured member comprising sealing ring means carried by said member, said sealing ring means being in registration on oppositely disposed sides of said apertured member;

means supporting said apertured member for movement with respect to the conduit axis and through said slit, said apertured member supporting means comprising a second pair of oppositely situated telescopic arms, first ends of said arms of second pair being coupled to said apertured member; and drive means engaging said arms of said first and second pairs adjacent the second ends thereof, said drive means imparting arcuate motion to said shut-off and apertured members about a common axis whereby fluid flow through the conduit will be prevented when said shut-off member is positioned in the conduit slit with its peripheral sealing surfaces in registration with the facing ends of the upstream and downstream conduit portions and fluid flow through the conduit will be permitted when apertured member is positioned in the conduit slit with its peripheral sealing surfaces in registration with the facing ends of the upstream and downstream conduit portions.

2. The apparatus of claim 1 wherein said shut-off member and apertured member are spatially separated and cooperate to define a spherical surface.

3. The apparatus of claim 2 wherein the telescopic arms of said first and second pairs are resiliently biased in the direction of elongation.

4. The apparatus of claim 2 wherein said drive means comprises a rotatable shaft connected to said arms of said pairs whereby motion is simultaneously imparted to said members.

5. The apparatus of claim 4 wherein said drive means comprises a rotatable shaft connected to said arms of said pairs whereby motion is simultaneously imparted to said members.

* * * * *

UNITED STATES PATENT AND TRADEMARK OFFICE
CERTIFICATE OF CORRECTION

PATENT NO. : 4,354,665
DATED : October 19, 1982
INVENTOR(S) : Leon Ulveling and Pierre Mailliet It is certified that error appears in the above-identified patent and that said Letters Patent are hereby corrected as shown below:

Column 1, line 17, change "4,253,485" to --4,353,485--.

Column 1, line 22, change "4,253,485" to --4,353,485--.

Column 1, line 49, change "4,253,485" to --4,353,485--.

Column 1, line 51, change "4,253,485" to --4,353,485--.

Column 2, line 39, change "4,253,485" to --4,353,485--.

Column 3, line 17, change "of" to --to--.

*Signed and Sealed this*

*Twenty-seventh* Day of *March 1984*

[SEAL]

*Attest:*

*Attesting Officer*

GERALD J. MOSSINGHOFF
*Commissioner of Patents and Trademarks*